United States Patent [19]

Tadokoro

[11] Patent Number: 4,586,147

[45] Date of Patent: Apr. 29, 1986

[54] HISTORY INFORMATION PROVIDING DEVICE FOR PRINTERS

[75] Inventor: Hiroyuki Tadokoro, Hitachi, Japan

[73] Assignee: Hitachi, Ltd., Tokyo, Japan

[21] Appl. No.: 464,210

[22] Filed: Feb. 7, 1983

[30] Foreign Application Priority Data

Feb. 8, 1982 [JP] Japan .......... 57-17480

[51] Int. Cl.[4] .......... G06F 15/20; G06F 11/00

[52] U.S. Cl. .......... 364/550; 371/20

[58] Field of Search .......... 355/14 C, 14 CU, 14 SH; 364/550, 551; 371/20

[56] References Cited

U.S. PATENT DOCUMENTS

| | | | |
|---|---|---|---|
| Re. 31,750 | 11/1984 | Morrow | 364/550 X |
| 3,572,551 | 3/1971 | Gillespie | 222/56 |
| 4,046,471 | 9/1977 | Branham et al. | 355/14 |
| 4,104,726 | 8/1978 | Fisk | 371/20 X |
| 4,122,996 | 10/1978 | Wilczek | 371/20 |
| 4,141,645 | 2/1979 | Reid et al. | 364/550 X |
| 4,162,396 | 7/1979 | Howard et al. | 371/20 |
| 4,169,275 | 9/1975 | Gunning | 358/300 |
| 4,206,995 | 1/1980 | Legg | 371/20 X |
| 4,227,798 | 10/1980 | Steiner | 371/20 X |
| 4,432,064 | 2/1984 | Barker et al. | 364/550 |

*Primary Examiner*—Edward J. Wise

*Attorney, Agent, or Firm*—Antonelli, Terry & Wands

[57] ABSTRACT

Disclosed in a history information providing device for use in a printer, such as a laser beam printer, having a print producing section, operation watching sensors and a programmable control section for controlling the print producing section. The history information providing device includes a non-volatile memory for taking-out the latest failure information such as the number of times of paper jam and the number of times of toner supply, and the latest maintenance information such as the total number of pages of printed paper and the total number of pages of printed paper by paper sizes, from the sensors and storing the latest failure and/or maintenance information therein. The device also includes a print-out instructing circuit for producing a print-out instruction to print out at least a part of the failure and/or maintenance information stored in the non-volatile memory and the secondary history information obtained from the failure and/or maintenance information. When the print-out instruction circuit has produced a print-out instruction, a part of the latest history information stored in the non-volatile memory is read out corresponding to the produced print-out instruction, and the read out part of the latest history information is subjected to calculation or modification, if necessary, and printed out by the printer per se.

10 Claims, 12 Drawing Figures

FIG. 3E

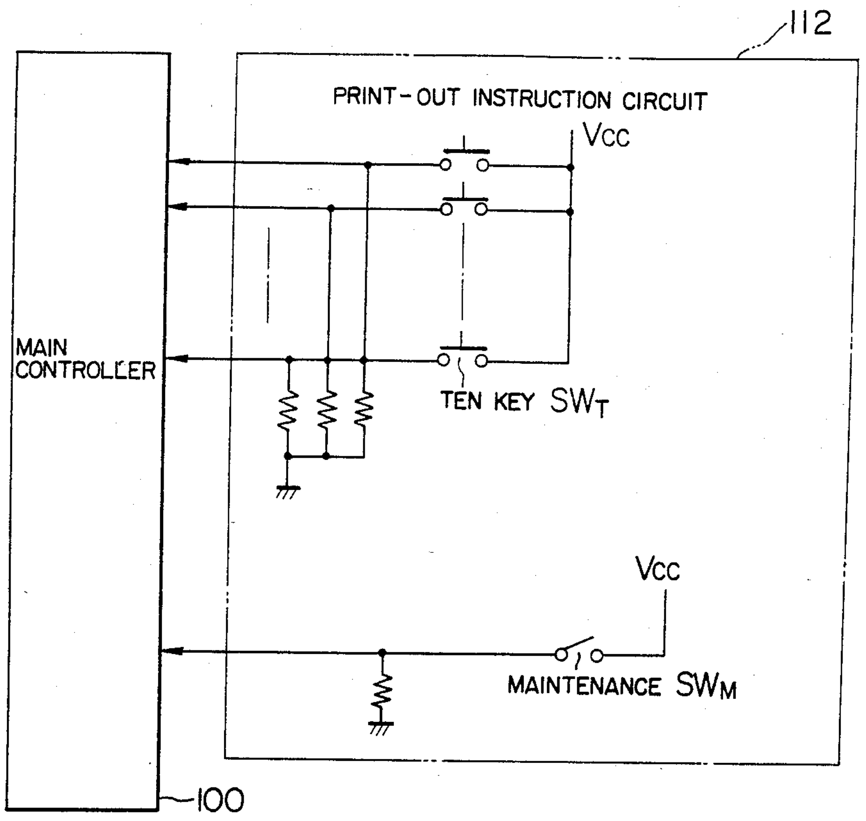

FIG. 4

| (ADDRESS) | (CONTENTS) | (WRITE) | (READ) |
|---|---|---|---|
| $ 00 FOR USER MAINTENANCE INFORMATION | TOTAL NUMBER OF PRINTED PAGES | MAIN CONTROL CIRCUIT | PRINT-OUT INSTRUCTION CIRCUIT (FOR USER) |
| | NUMBER OF PRINTED PAGES BY PAPER SIZES | | |
| | TOTAL OPERATED TIME OF DEFLECTION MIRROR DRIVING MOTOR | | |
| $ 20 FOR DEALER FAILURE INFORMATION | TOTAL NUMBER OF TIMES OF PAPER JAM | MAIN CONTROL CIRCUIT | PRINT-OUT INSTRUCTION CIRCUIT (FOR SERVICE MAN) |
| | NUMBER OF TIMES OF PAPER JAM OF PLACES (BY SENSORS) | | |
| | NUMBER OF TIMES OF PAPER JAM BY PAPER SIZE | | |
| | NUMBER OF TIMES OF TONER SUPPLY | | |
| $ 3F | | | |

HISTORY INFORMATION PROVIDING DEVICE FOR PRINTERS

This invention relates to printers and in particular to a history information providing device suitable for maintenance and inspection of the printers.

Conventionally, various kinds of printers have been utilized, and maintenance and inspection have been a serious problem common to such various kinds of printers. This is because the mechanical operation cost of semiautomatic machines such as printers may include maintenance cost as a major part thereof, and, therefore, means or procedures to reduce time required for the maintenance/inspection are advantageous in reduction in such mechanical operation cost.

To reduce the time required for the maintenance/inspection of a printer, it is advantageous to utilize the history information of the printer. History information can be briefly classified as follows:

(1) Failure Information: for example, paper jam; and (2) Maintenance Information: for example, worn condition.

How to recognize such history information is an important matter for an operator, user or service man of a printer.

In the conventional printers, as the maintenance information, the total number of pages of printed paper has been displayed by display means such as an accumulated paper number counter or an alpha-numerical display tube. The necessity of separate provision of such display means has caused a problem in limitation of space and has been disadvantageous in cost reduction.

Further, with respect to failure or fault information, the recognition of such failure information could not be attained in most conventional printers because non-volatile means such as a non-volatile memory could not be employed in the conventional printers. Although failure information could be recognized when it occurred, the failure information was refreshed or cleared upon the recovery of the failure, so that there was a problem in that the history information as to failures or faults of printers could not be recognized. This has made it difficult to attain proper maintenance and repair of the printers.

An object of the present invention is, therefore, to provide a history information providing device for a printer in which the latest (updated) history information required for maintenance/inspection of the printer can be effectively provided to the dealer or service person when maintenance/inspection is performed.

In accordance with the concept of the present invention the latest history information for maintenance/inspection of a printer is, in a non-volatile fashion, stored in the printer per se on the basis of the information detected by various sensors, so that when required, the latest information is not displayed by display means such as an alpha-numerical tube but is instead printed out by the printer per se owing to its own printing ability.

According to an aspect of the present invention, there is provided a history information output (or providing) device for a printer having a print producing section provided with information pick-up means for detecting a printing operation and a programmable control section for controlling the print producing section, the history information output device comprising a non-volatile memory provided in the programmable control section for storing the latest failure and/or maintenance information relating to the print producing section and picked up by the information pick-up means, and print-out instruction means for producing a print-out instruction to cause the print producing section to print out at least a part of the latest printer history information including the latest failure and/or maintenance information and self-diagnosis information obtained on the basis of the latest failure and/or maintenance information.

According to the above-mentioned arrangement, the history information output device for a printer can acquaint an operator or user, when required, with the latest history information required for maintenance/inspection of the printer in an obvious form to thereby make it possible to expect the improvement in the efficiency of the maintenance/inspection operation and in the maintenance cost reduction.

Preferred embodiment means of the invention will be described by referring to the accompanying drawings, in which:

FIG. 3E is a circuit diagram illustrating the print-out instructing circuit in FIG. 2;

FIG. 4 is a diagram illustrating allocation of the working areas in the static read-only memory (ROM) in FIG. 3A.

Prior to the description of embodiments of the present invention, description will be made, referring to FIG. 1, with respect to a laser beam printer which employs transfer type electrophotographic processing (xerographic processing) and which is a type of printer to which the present invention is applied.

Figure 1:
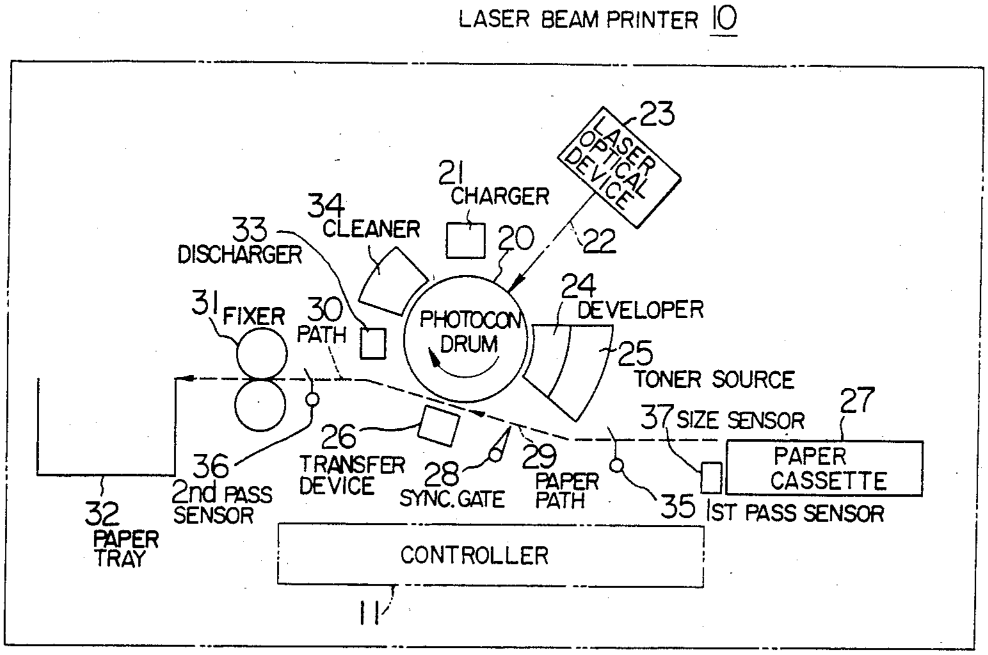
FIG. 1 is a schematic diagram of a laser beam printer which employs transfer type electrophotographic processing (xerographic processing) and which is a type of printer to which the present invention can be applied.

In FIG. 1, a laser beam printer 10 is provided with a photoconductive drum 20 which rotates in the direction shown by an arrow and passes by a plurality of xerographic processing stations.

Provided in the first xerographic processing station is a charger 21 for projecting positive or negative charges onto the surface of the photoconductive drum 20. Preferably, the charger 21 may uniformly project electrostatic charges. The charging is performed under the condition that there is no light such as optical image projection so that an exposing light, such as a laser beam 22 shown by a one-dotted chain line arrow, may change the distribution of charges on the surface of the photoconductive drum 20 to thereby prepare for the image developing and transferring operations.

The laser beam 22 emitted from a laser optical device 23 is subjected to pulse-modulation by a controller 11 and caused, by a deflection mirror driving motor (not shown) provided in the laser optical device 23, to scan the photoconductive drum 20 in the axial direction thereof. Since the photoconductive drum 20 is rotated in the direction as shown by the arrow, an electrostatic image, namely a latent image, is produced in the surface of the photoconductive drum 20.

In the next xerographic processing station there is provided a developer 24 which receives toner particles from a toner supply source 25 and applies the toner particles to surface portions of the drum 20 at which charges still remain. In particular, the polarity of the toner particles forwarded to the developer 24 from the toner supply source 25 is selected to be opposite to that of the charges on the surface of the photoconductive drum 20. Accordingly, the toner particles may attach to the charged portions and do not attach to the non-charged portions at which the laser beam has been irradiated. Thus, the photoconductive drum 20 which has passed by the developer 24 bears a developed image corresponding to the signal modulated by the controller 11. The toner particles on the latent image are transferred to a sheet of print paper in the next xerographic station at which a transfer device 26 is provided. The print paper is fed along a paper path 29 and through a synchronizing gate 28 from a paper cassette 27 to the transfer device 26. At this xerographic station, the print paper is made in contact with the developed image on the surface of the photoconductive drum 20 so that the toner particles on this image may be transferred onto the paper.

Upon the completion of transfer, the image bearing print paper is separated from the surface of the photoconductive drum 20 and caused to advance along a succeeding paper path 30.

At the next xerographic station where a fixer 31 in the form of a thermal roller is provided, the toner particles on the print paper are fixed thereto so as to provide a fixed image on the print paper.

Then, the print paper is discharged into a discharge tray 32.

Turning back to the photoconductive drum 20, a considerable amount of toner particles remain on the surface of the drum 20 even after the drum 20 has passed by the transfer device 26. Accordingly, the remaining charges on the surface of the photoconductive drum 20 are neutralized by a discharger 33 in the next xerographic station so that the neutralized toner particles are removed from the drum surface by a cleaner 34 at the next but one station. Thus, one printing cycle has been completed.

The laser beam printer 10 is provided with further means as follows other than the above-mentioned xerographic processing means.

There are provided, as paper jam detecting means, first and second paper passage detecting sensors 35 and 36 on the paper paths 29 and 30, respectively.

Since various kinds of print papers are used, it is necessary to adjust the timing of xerography sequence to correspond to the length of paper in the travelling direction thereof. To this end, there is provided a paper size sensor 37 for automatically detecting the size of paper.

Thus, the print producing section of the printer 10 is constituted by the photoconductive drum 20, the charger 21, the laser optical device 23, the developer 24, the toner supply source 25, the transfer device 26, the paper cassette 27, the synchronizing gate 28, the fixer 31, the paper discharge tray 32, the discharger 33, and the cleaner 34. The controller 11 which constitutes the main control section of the printer 10 may be those disclosed in Braham U.S. Pat. No. 4,046,471 issued Sept. 6, 1977 and Gunning U.S. Pat. No. 4,169,275 issued Sept. 25, 1979, each relating to control techniques for laser scanning xerographic printers.

Referring to the drawings, an embodiment of the present invention will be now described. The embodiment relates, by way of example, to a laser beam printer utilizing the xerographic processing as mentioned above.

Figure 2:
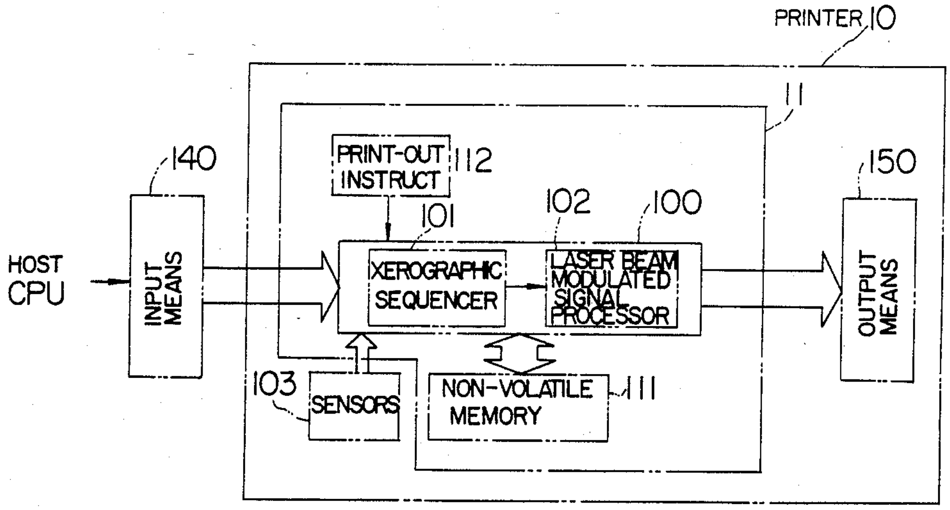
FIG. 2 is a block diagram illustrating the configuration of the printer according to an embodiment of the present invention.

FIG. 2 is a block diagram illustrating the basic configuration of the printer according to the present invention. In FIG. 2, reference numerals 10 and 11 denote the same laser beam printer and controller as those shown in FIG. 1, respectively.

The controller 11 is constituted, as shown in FIG. 2, by a main control circuit 100 which includes a xerographic sequencer 101 for performing the above-mentioned xerography processing and a laser beam modulated signal processor 102 provided with such as a 64 KB (kilobytes) RAM, a non-volatile memory 111 into which the latest history information on the printer mechanisms is written from the main control circuit 100 and from which it is read out when required, and a print-out instructing circuit 112 for instructing a command to the main control circuit 100 when the latest history information is required to be printed out.

Basically, the main control circuit 100 may be those disclosed in the above-mentioned two U.S. patents and receives inner condition signals from a group of sensors 103 and external signals from input means 140. The sensor group 103 includes the first and second paper passage detecting sensors 35 and 36 for detecting paper jam, the paper size detecting sensor 37, which are the same as those described above with respect to FIG. 1, and a ready state sensor (not shown) for detecting the ready state of the fixer 31. Since the fixer 31 is in the form of a thermal roller, it is preheated in use until it has reached the temperature at which fixing can be attained and then it is controlled to be maintained within a proper temperature region. To this end, the temperature of the fixer 31 is detected by a temperature sensor (not shown) and subjected to feed-back control. The ready state sensor detects the ready state of the thermal fixer 31. The input means 140 is responsive to a host CPU which handles the printer 10 as its terminal device so as to apply output alpha-numerical data signals, data print request signals, etc. to the main control circuit 100. That is, for example, upon the receipt of the data print request signal, the main control circuit 100 applies control signals to the respective devices provided in the print producing section of the laser beam printer 10 so as to cause the devices to perform the xerographic processing. Further, in FIG. 2, output means 150 may include the above-mentioned devices 20 to 34 which are, for example, the type system, the paper feed system, the laser exposing system and which are on-off controlled in synchronism with the rotation of the drum 20 of the printer.

Figure 3A:
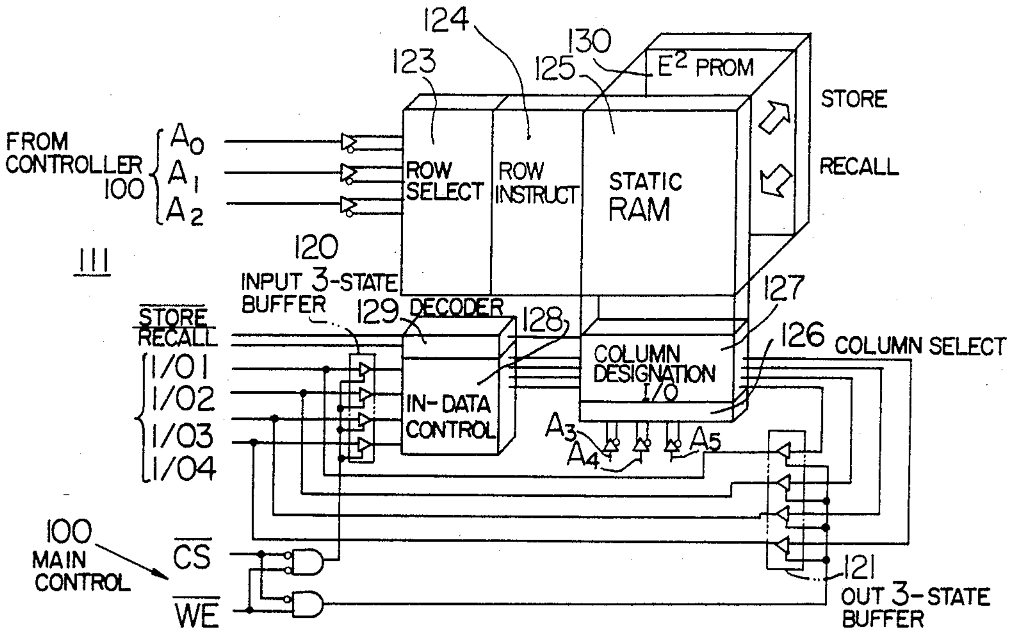
FIG. 3A is a schematic block diagram of the non-volatile memory in the embodiment of FIG. 2.

FIG. 3A shows a block diagram illustrating the basic configuration of the above-mentioned non-volatile memory 111.

In FIG. 3A a chip selection signal $\overline{SC}$ and a write enable signal $\overline{WE}$ are applied from the main control circuit 100 to the non-volatile memory 111. When the signal $\overline{CS}$ is at its low level (hereinafter simply referred to as LOW), the non-volatile memory 111 is in its activated state in which it becomes externally accessible and in addition when the signal $\overline{WE}$ is LOW, an input three-state buffer 120 is activated so that input/output devices $I/O_1$ to $I/O_4$ are made available in the input port of the non-volatile memory 111.

When the signal $\overline{WE}$ is in its high level (hereinafter referred to as HIGH), an output three-state buffer 121 is activated so that the $I/O_1$–$I/O_4$ are made available in the output port of the non-volatile memory 111.

Address signals $A_0$–$A_2$ from the main control circuit 100 designate the row addresses of a static RAM (random access memory) 125 through a row selecting circuit 123 and a row instructing circuit 124, while address signals $A_3$–$A_5$ from the main control circuit 100 designate the column addresses of the RAM 125 through a column selecting circuit 126 and a column instructing and input/output circuit 127.

The writing operation into the static RAM 125 will be now described.

First, both the signals $\overline{CS}$ and $\overline{WE}$ are set to be LOW. Signals from the $I/O_1$–$I/O_4$ are then applied to an input data control circuit 128 through the input three-state buffer 120. The column instructing and input/output circuit 127 is controlled on a time division basis and transfers the output of the input data control circuit 128 to the static RAM 125 after the column designation. Thus, the output signals from the $I/O_1$–$I/O_4$, which are now operating as the input port of the non-volatile memory 111, have been written into the static RAM 125.

When the contents are read out of the static RAM 125, on the other hand, the signal $\overline{WE}$ is made HIGH so that the output signals are transferred from the static RAM 125 to the $I/O_1$–$I/O_4$, which are now operating as the output port of the non-volatile memory 111, through the column instructing and input/output circuit 127 and the output three-state buffer 121.

A decoder 129 controls the data transfer between the static RAM 125 and an $E^2$PROM (electrically erasable programmable read only memory) 130. The $E^2$PROM 130 may be Zixor X2210 available on the market. That is, upon the turning-on of the power supply, the decoder 129 instructs the $E^2$PROM 130 and the static RAM 125 to transfer data from the former to the latter in response to a signal $\overline{RECALL}$ applied from e.g. the main control circuit 100, while when the power supply is turned off, it instructs them to transfer data from the latter to the former in response to a signal $\overline{STORE}$ applied from e.g. the main control circuit 100. The static RAM 125 and the $E^2$PROM 130 are arranged such that they correspond to each other in a one-to-one bit relation.

Figure 3B:
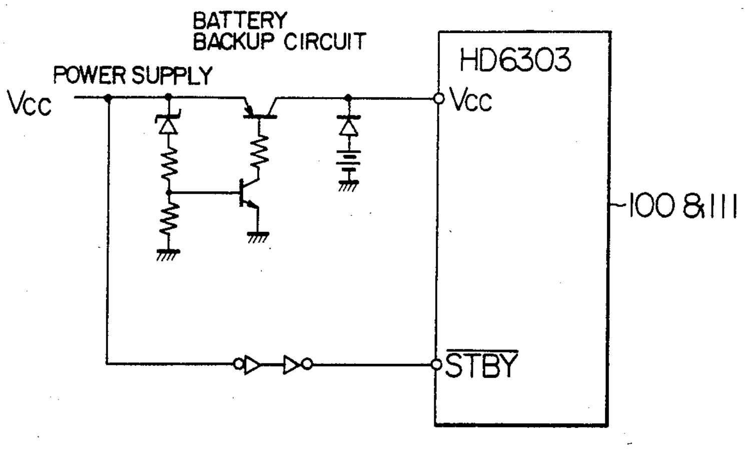
FIGS. 3B to 3D are circuit diagrams illustrating examples of the non-volatile memory constituted by a battery backed-up random access memory (RAM)
Figure 3C:
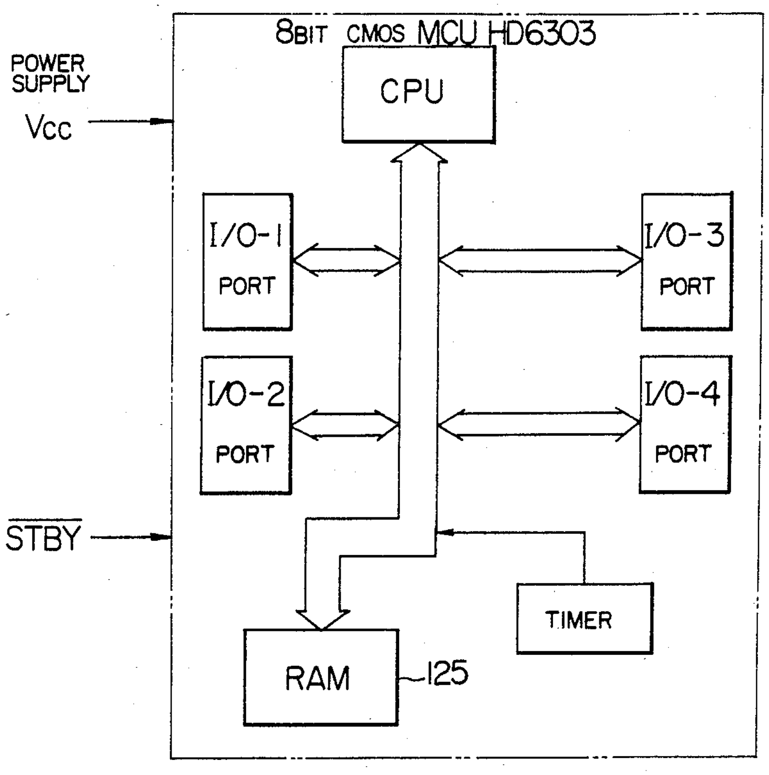
Figure 3D:
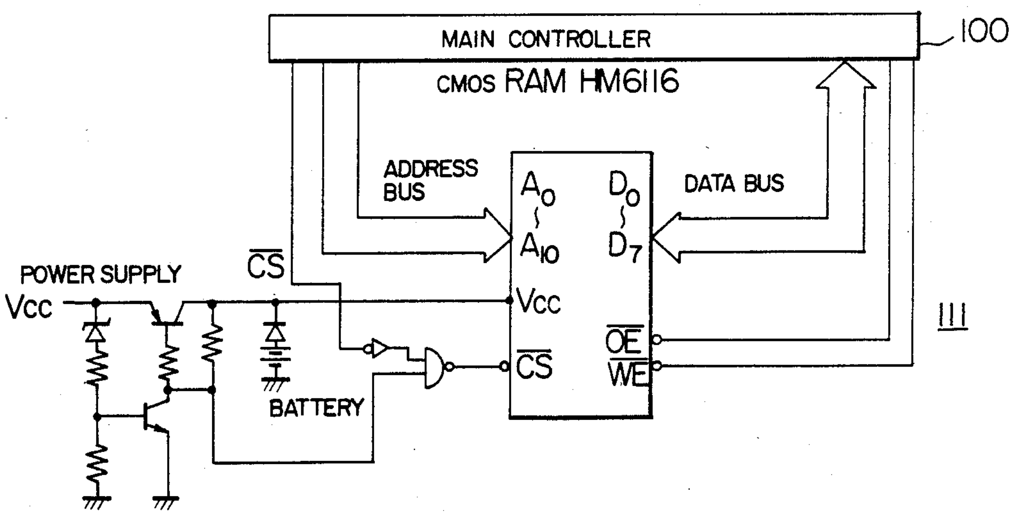

As shown in FIG. 3B, the main control circuit 100 and the non-volatile memory 111 are constituted by a single-chip CMOS MCU (complementary metal oxide semiconductor microcomputer unit) which includes ROM, RAM, CPU, ACI (serial interface) and which may be the type HD 6303 of HITACHI. The MCU chip includes a battery backed-up RAM in place of $E^2$-PROM to provide the non-volatile store performance. FIG. 3C is a block diagram illustrating the configuration of the MCU HD 6303. In FIG. 3C, when the power supply Vcc is in its off-state, the whole circuit of the MCU chip is battery-backed up, while when the power supply is on, that is, when a signal applied to the MCU chip is HIGH, only the RAM 125 is battery-backed up. FIG. 3D shows an example of the configuration of the non-volatile memory 111 of the battery-backup type employing CMOS RAM IC which may be for example such as the type HM 6116 of HITACHI. In this IC configuration, with respect to the failure information and/or the maintenance information, only the number of times of events and the time elapsed from each event are stored in the non-volatile memory 111. Seven bytes $A_0$–$A_6$ are connected to an address bus and eight bits $D_0$–$D_7$ are connected to a data bus. The item format program for such information is stored in the main control circuit 100.

FIG. 3E shows an example of the print-out instructing circuit 112 which employs a known maintenance switch $SW_M$ to supply the main control circuit 100 with instructions of reading information out of the non-volatile memory and performing print-out operation. A ten key $SW_T$ supplies the main control circuit 100 with an instruction or predetermined key code so that only the specified part of the stored information can be read out. When the maintenance switch $SW_M$ is on, the laser power and the printing process timings are adjusted and the paper jam counting and the history information storing are reset or cleared.

Turning to FIG. 3A, the static RAM 125 is used to provide a working area for the latest history information required for maintenance/inspection. FIG. 4 shows the allocation of the working area of the static RAM 125. In the drawing, ADDRESS denotes the addresses $00, $20 and $3F, CONTENTS denotes the contents of stored information, WRITE denotes the portion to be controlled in writing and READ denotes the part from which reading is performed. The contents of the working area allocation will be now described.

In the laser beam printer 10, the following information is required for the user when maintenance/inspection is performed:

(1) The total number of pages of printed paper, which has been conventionally counted by an accumulated sheet-number counter or the like, as the latest information for controlling the service life of the photoconductive drum 20, the developing agents, etc.;

(2) The total number of pages of printed paper by paper sizes for obtaining information with respect to the state of used print paper; and (3) The total operated time of a deflection mirror driving motor for governing the life of the deflection mirror driving motor. On the assumption that the deflection mirror driving motor operates for a predetermined time for one sheet of print paper, the total operated time of the deflection mirror driving motor may be obtained by multiplying the total number of pages of printed paper by the above-mentioned predetermined time.

The above-mentioned maintenance information is mainly required for the user and therefore the printer is arranged such that the print-out of the latest maintenance information may be performed by merely pressing down a separately provided push button with no help by a person of the dealer side. The maintenance information is updated by the instruction from the main control circuit 100 in accordance with the operation flow which will be described later.

As the latest history information which is required for maintenance/inspection and which requires the help by the dealer, it is advantageous to obtain the latest failure information as follows other than the latest maintenance information as mentioned above:

(1) The total number of times of paper jam which has been detected by the main control circuit 100 by judging the input timings of the first and second paper passage detecting sensors 35 and 36 in the laser beam printer 10;

(2) The total number of times of paper jam by places of jam occurrence and by paper passage detecting sensors (when two or more sensors are provided);

(3) The total number of times of paper jam by paper sizes; and (4) The total number of times of toner supply by the toner supply source.

The above-mentioned latest failure information may be an important information source which may acquaint the dealer or service man, who is not always present by the laser beam printer 10 when the printer is operated, with the state of actual operation of the printer 10.

With respect to the utilization of the latest failure information, the printer is arranged such that only a service man or the like dispatched by the dealer can produce the instruction of print-out of the latest failure information by actuating a push-button provided for private use for the service man or by the predetermined key code input as shown in FIG. 3E, at the time of periodical inspection or checking or upon the completion of failure repair. The latest failure information is renewed by the instruction from the main control circuit 100 in accordance with the operation flow which will be described later.

Referring to FIGS. 5 to 8, the above-mentioned operation flow will be described.

Figure 5:
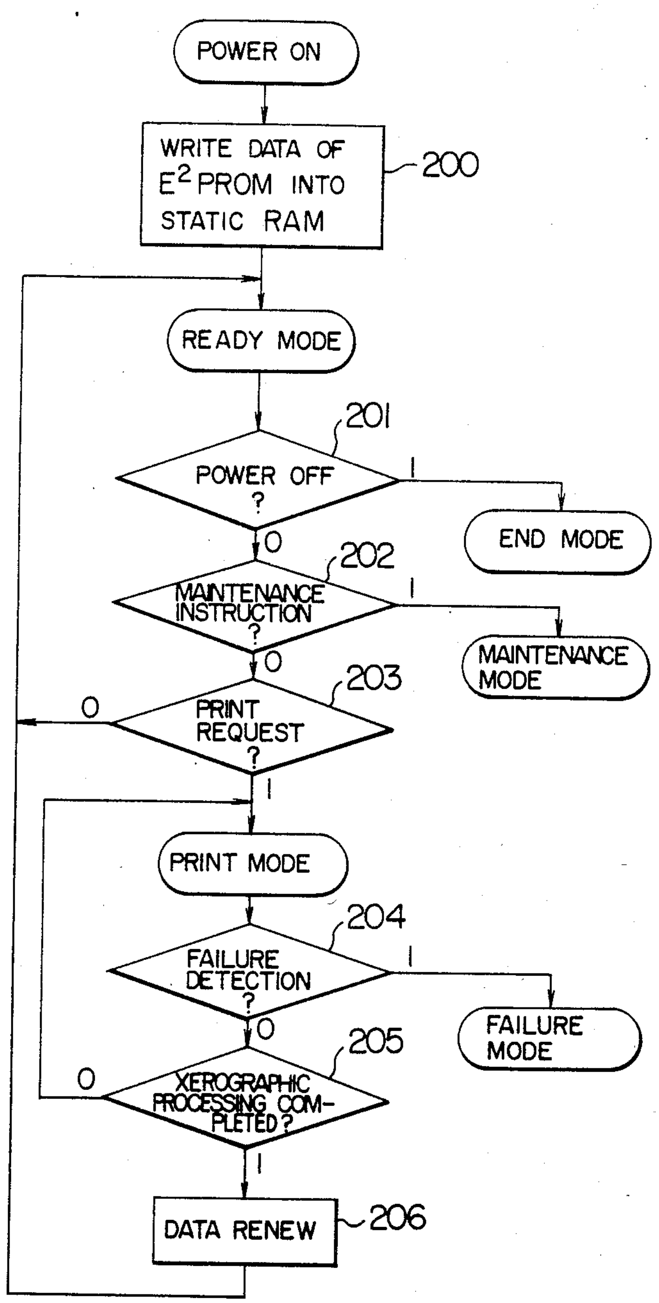
FIGS. 5 to 8 are flowcharts of operations in the above-mentioned embodiment.

In FIG. 5, upon turning the power on, the data with respect to the CONTENTS in FIG. 4 stored in $E^2$-PROM 130 of the non-volatile memory 111 is written into the static RAM 125 in the step 200 and then the operation state goes into the ready mode. Next, in the step 201, the power is judged whether it is in its off-state or not, and when it is in its off-state, the operation state shifts into the end mode, while if not so, the operation state goes into the step 202 in which detection is made as to whether a maintenance instruction from the print-out instructing circuit 112 is present or not.

When there exists a maintenance instruction, the operation state goes into the maintenance mode, while if not so, it goes into the step 203 in which detection is made as to whether there exists a print request from the input means 140.

When there exists no print request, the operation state returns into the ready mode again, while if the print request exists, it goes into the step 204 in which detection is made as to whether any failure such as paper jam exists or not. When there exists any failure or fault, the operation state goes into the failure mode, while if not so, it goes into the step 205. In the step 205, the operation state traces the loop to return to the print mode as shown in FIG. 5 until the printing operation has been completed through the above-mentioned xerographic processing. Upon the completion of the printing operation, the operation state goes into the step 206 in which the data of the latest maintenance information stored in the static RAM 125, such as the total number of pages of printed paper, the total number of pages of printed paper in each paper size, and the total amount of operated time of the deflection mirror driving motor, is renewed by incrementing through the counter the number of times of the concerned events and the operation state returns then into the ready-mode again.

Figure 6:
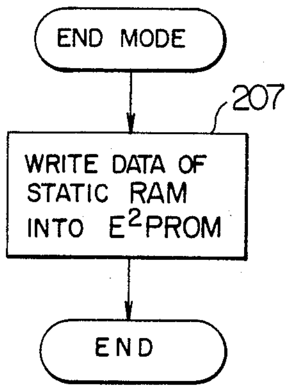

Referring to FIG. 6, the end mode will be now described. When the operation state has shifted from the step 201 of FIG. 5 into the end mode of FIG. 6, the above-mentioned data stored in the static RAM 125 of the non-volatile memory 111 is transferred to the $E^2$-PROM to be stored therein in the step 207 of FIG. 6 and then the operation terminates.

Figure 7:
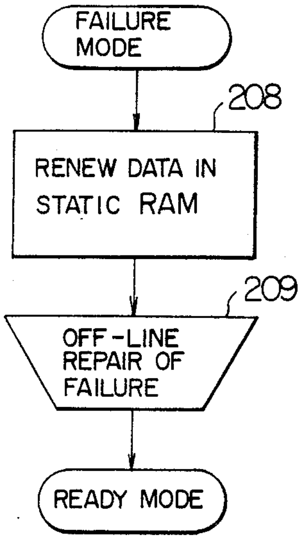

Referring to FIG. 7, the failure mode is described. When the operation state has shifted from the step 204 of FIG. 5 to the failure mode, the data of the latest failure information stored in the static RAM 125 are renewed in the step 208 of FIG. 7. In case of a failure or fault, since the power supply to the non-volatile memory 111 and the main control memory 100 is maintained as it was, while the power supply to the output means 150 in which there are dangers of causing electrical shocks from a high potential source therein is cut off, it is possible to reliably renew the data of the latest failure information. Then, upon the completion of repair of the failure through off-line processing by the manual operation by any operator or service man, the failure flag is erased and the operation state returns to the ready mode again so as to enable the print-out to be performed. By the way, the non-volatile memory 111 is maintained in its activated state even during a failure.

Figure 8:
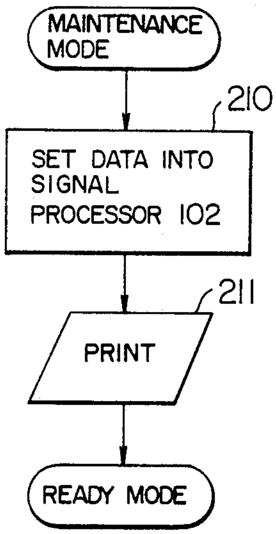

Referring to FIG. 8, the maintenance mode will be described. When the operation state has shifted into the maintenance mode in the step 202 of FIG. 5, the necessary data of the latest history information in the static RAM 125 is fetched into the laser beam modulated signal processor 102 in the main control circuit 100 in the step 210. Then, in the step 211, the necessary data of the latest history information is printed out through the xerographic processing by the laser beam printer 10. Upon the completion of the print-out, the operation state returns into the ready mode again.

By the way, the amount of the latest history information required by the dealer or service man is more than that required by the user. In this regard, the print-out instructing circuit 112 may be arranged such that it produces instruction signals for the user as well as the dealer. However, the detail of the arrangement is not described here in conjunction with the embodiment.

Further, the latest history information may include not only the latest maintenance information and the latest failure information as mentioned above but the secondary or succeeding information, such as the rate of paper jam, the rate of paper jam in each paper size, the frequency or rate of the toner supply, the extent of waste of wasting members, which is obtained by arithmetic operations in the main control circuit 100 on the basis of the above-mentioned latest maintenance and failure information data. The paper jam rate is determined by the ratio of the number of times of paper jam to the total number of pages of printed paper. With respect to the total number of pages of printed paper, there are a case where the total number of pages of printed paper is counted from the initiation of operation of the printer and another case where it is counted from the initiation of every service interval after a service man has reset or cleared the total number of printed paper incremented so far. The toner supply rate is obtained by calculating the number of toner supply times by service intervals by counting the r.p.m. of the toner supply motor. The basic configuration of toner controller including the developer 24 and the toner source 25 is disclosed in U.S. Pat. No. 3,572,551 issued Mar. 30, 1971 to Gillespie et al.

As described above, according to the embodiment of the present invention, the latest history information for maintenance/inspection of a laser beam printer can be obtained in an obvious form by printing it out by the printer, resulting in advantages in that the maintenance- /inspection of printer can be easily performed and the cost of maintenance can be therefore remarkably reduced. Further, the efficiency in working of maintenance/inspection is also remarkably improved.

Further, since the latest history information is directly printed out and produced in the form of a printed data, there is no need of providing any display means such as an alpha-numerical display device, resulting in improvements in reliability and in the reduction of the cost from an economical point of view.

Further, also from the dealer's standpoint, it becomes possible to follow up the failure, such as paper jam, at the periodical inspection or upon the completion of repair of failure so as to obtain strong data on the market of products, resulting in improvement in reliability. Further, in the case where paper jam has frequently occurred in the same position, it is possible to immediately effect proper adjustment when a service man is dispatched, resulting in reduction in the time required for maintenance/inspection.

As another embodiment, a battery-backup RAM may be used as the non-volatile memory 111 with the same effect.

The renewal of the contents of the static RAM 125 as described above in the first-mentioned embodiment may be performed by counting up (incrementing) from the initial value which is reset to be zero or counting down from (decrementing) the initial value which is set to a predetermined value.

Further, the print-out instructing circuit 112 for producing instruction signals as described above in the first-mentioned embodiment may be arranged such that the instruction signal is generated in response to a forced external signal produced by the operator, for example, by depressing a push button, or, alternatively, the main control circuit 100 in the controller 11 effects self-diagnosis by comparing the latest history information stored in the non-volatile memory 111, e.g. the latest maintenance information relating to the total number of pages of printed paper, with a previously set maintenance condition, e.g. a preset number of pages to be printed so that when the actually printed page number exceeds the preset value, the main control circuit 100 automatically produces a signal, in response to which the print-out instructing circuit 112 generates the print-out instruction signal to print out the result of self-diagnosis for user's or dealer's information and warning. In the latter arrangement in which self-diagnosis is effected, the setting value of the number of pages to be printed may be stored in the main control circuit 100 as one of the maintenance conditions and a comparator circuit function (not shown) is provided in the main control circuit 100 for comparing the latest number of the printed pages with the setting number of pages to be printed so as to automatically produce a signal on the basis of the result of comparison.

I claim:

1. A history information providing device for a printer having a print producing section provided with information pick-up means for detecting printing operations and having a programmable control section for controlling said print producing section, said history information providing device comprising:

a non-volatile memory provided in said programmable control section for storing the latest failure and/or maintenance information relating to said print producing section and picked up by said information pick-up means; and print-out instructing means for producing a print-out instruction to cause said print producing section to print out at least a part of the latest printer history information including said latest failure and/or maintenance information stored in said non-volatile memory.

2. A history information providing device according to claim 1, in which said print-out instructing means includes input means for inputting a print-out instruction by an operator of said printer in accordance with a requirement by the operator.

3. A history information output device according to claim 2, in which said input means includes a manually actuatable switch for enabling said print producing section to print out only a selected part of said latest history information.

4. A history information providing device according to claim 2, in which said input means includes a password sequence circuit for producing said print-out instruction in response to a predetermined key code applied thereto by the operator.

5. A history information providing device according to claim 1, in which said print-out instructing means includes means for comparing the latest maintenance information stored in said non-volatile memory with a preset maintenance condition to effect self-diagnosis so as to produce said print-out instruction when said latest maintenance information exceeds said preset maintenance condition.

6. A history information providing device according to claim 1, in which said non-volatile memory includes a static random access memory (RAM) and a non-volatile electrically erasable programmable read only memory ($E^2PROM$) which corresponds to said static RAM in a one-to-one bit relation, said static RAM and said non-volatile $E^2PROM$ being arranged so that when a power source is turned off, the contents of said static RAM are transferred to said $E^2PROM$.

7. A history information providing device according to claim 1, in which said non-volatile memory includes a battery backed-up static RAM.

8. A history information providing device according to claim 1, in which means for accumulating the number of times of events is connected between said information pick-up means and said non-volatile memory so that every time failure information and/or maintenance information is picked up by said information pick-up means, the number of times of the event relating to the picked-up failure and/or maintenance information is incremented.

9. A history information providing device according to claim 1, in which said non-volatile memory is written-in by a main control circuit provided in said control section and read out by said print-out instructing means, a working area of said non-volatile memory being provided with a first place for storing therein maintenance information including at least one of the total number of pages of printed paper, the total number of pages of printed paper by paper sizes and the total operated time of a deflection mirror driving motor, and a second place for storing therein failure information including at least one of the total number of times of paper jam, the total number of times of paper jam by paper jam occurring places, the total number of times of paper jam by paper sizes and the total number of times of toner supply.

10. A history information providing device according to claim 9, in which said print-out instructing means causes said main control circuit to read out the maintenance and/or failure information stored in said non-volatile memory and calculated history information including at least one of a rate of paper jam, a rate of paper jam by paper sizes, a rate of toner supply and an extent of waste of wasting members on the basis of the read-out information so that a selected part of said history information can be printed out.

* * * * *